United States Patent

[11] 3,556,228

[72] Inventor Orlan H. Mork
6705 Southdale Road, Edina, Minn. 55435
[21] Appl. No. 748,514
[22] Filed July 29, 1968
[45] Patented Jan. 19, 1971

[54] APPARATUS FOR LEVELING SOIL AND THE LIKE
3 Claims, 4 Drawing Figs.
[52] U.S. Cl. ................................................. 172/199, 172/767
[51] Int. Cl. ...................................................... A01b 49/02
[50] Field of Search .......................................... 172/199, 767, 393, 451, 776

[56] References Cited
UNITED STATES PATENTS

| | | | |
|---|---|---|---|
| 425,793 | 4/1890 | Holland | 172/199 |
| 563,760 | 7/1896 | Folsom | 172/199 |
| 1,247,416 | 11/1917 | Leak | 172/199X |
| 1,267,623 | 5/1918 | Bowen | 172/199 |
| 1,727,181 | 9/1929 | Skinner | 172/767X |
| 2,983,060 | 5/1961 | Rosselot | 172/199 |
| 2,994,142 | 8/1961 | Newell et al. | 172/199 |
| 3,336,685 | 8/1967 | Keller | 172/199X |

FOREIGN PATENTS

| | | | |
|---|---|---|---|
| 1,314,296 | 11/1962 | France | 172/767 |

Primary Examiner—Robert E. Pulfrey
Assistant Examiner—James W. Peterson
Attorney—Merchant and Gould ABSTRACT: A frame including a plurality of transversely extending ground-engaging members each having a lower surface parallel and in a plane with the lower surface of the remaining members and upstanding beams adjacent the forward edge thereof adapted to be connected to the central link and lift arms of a three-point hitch so that through movement of one of the arms or the central link the orientation of the plane through the lower surface of the ground-engaging members can be altered to make any desired angle with the surface of the ground.

PATENTED JAN 19 1971

INVENTOR.
ORLAN H. MORK
BY
Merchant & Gould
ATTORNEYS

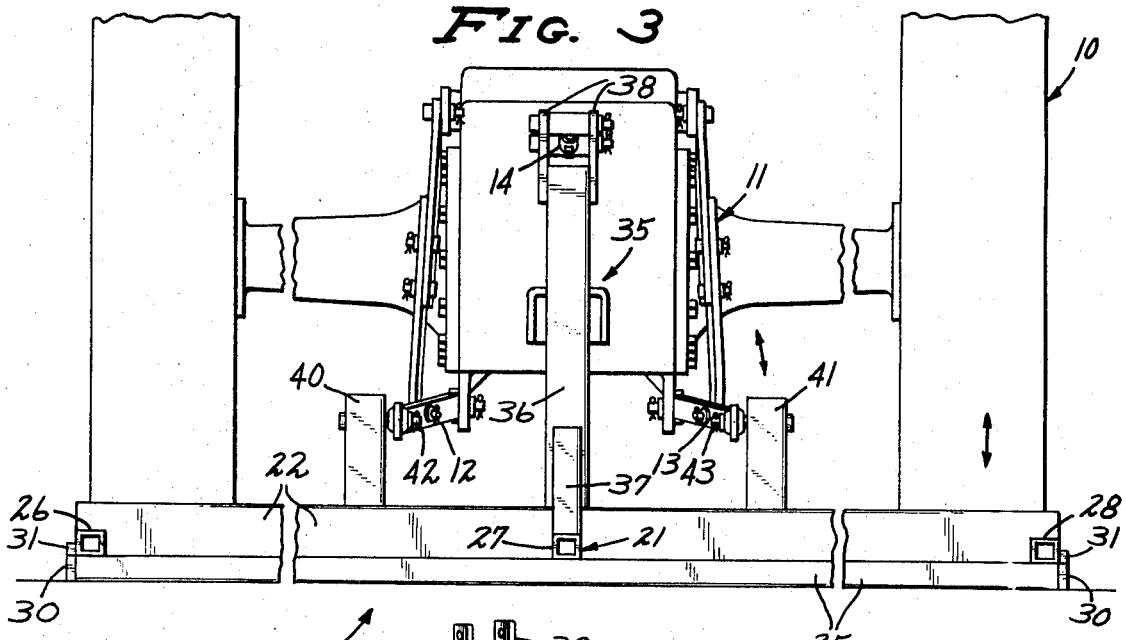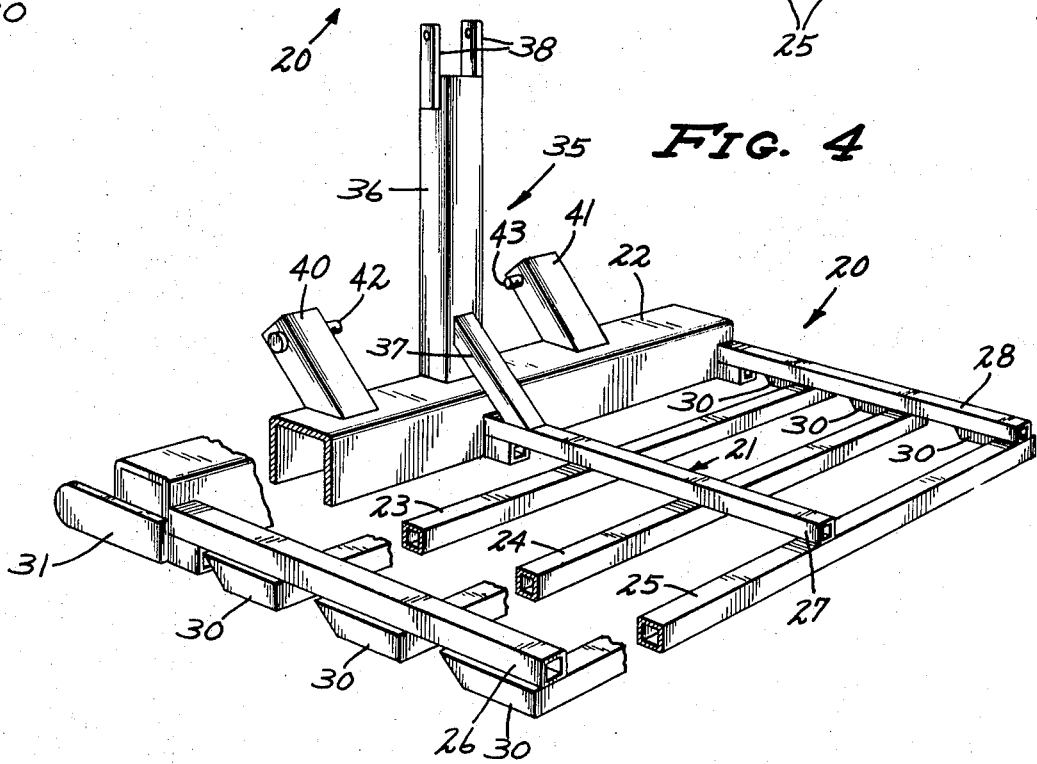

APPARATUS FOR LEVELING SOIL AND THE LIKE

BACKGROUND OF THE INVENTION

1. Field of the Invention

In many tasks, such as sodding, landscaping, some road construction, etc., it is important that the surface of the soil be completely smooth prior to operating thereon. In some instances the upper soil is loose and the smoothing or leveling operation simply requires rearranging the soil. In some instances, a different surface angle is desired and the leveling device must include some apparatus for grading the surface slightly as well as smoothing the loose soil.

2. Description of the Prior Art

In the prior art weighted boards and the like are dragged behind tractors or other draft means to smooth and level the surface of the soil. Devices such as these are unsatisfactory because there is no method by which the angle of the surface can be altered. Further, in the event of large quantities of loose soil, the soil has a tendency to pile up in front of the board and escape around the outer edges thereof leaving ridges in the surface.

SUMMARY OF THE INVENTION

The present invention pertains to apparatus for leveling soil and the like having a frame including a plurality of transversely extending ground-engaging members fixedly attached thereto each having at least one relatively straight lower edge positioned parallel and in a plane with similar edges on the remaining members and upstanding connecting means rigidly attached to said frame for attaching said frame to a three-point hitch connected to draft means.

It is an object of the present invention to provide improved apparatus for leveling soil and the like.

It is a further object of the present invention to provide apparatus for leveling soil having upstanding connecting means thereon attachable to a three-point hitch so that the angle of the apparatus can be varied to vary the angle of the surface of the soil.

It is a further object of the present invention to provide apparatus for leveling soil the angle of which can be varied so that the distance between the apparatus and the soil differs from the front edge to the rear edge thereof to accommodate large quantities of loose soil.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the FIGS.:

FIG. 3 is a view in rear elevation of the apparatus illustrated in FIG. 1, parts thereof removed; and FIG. 4 is a view in perspective of the present apparatus, parts thereof removed and shown in section.

DESCRIPTION OF THE PREFERRED EMBODIMENT

Figure 1:
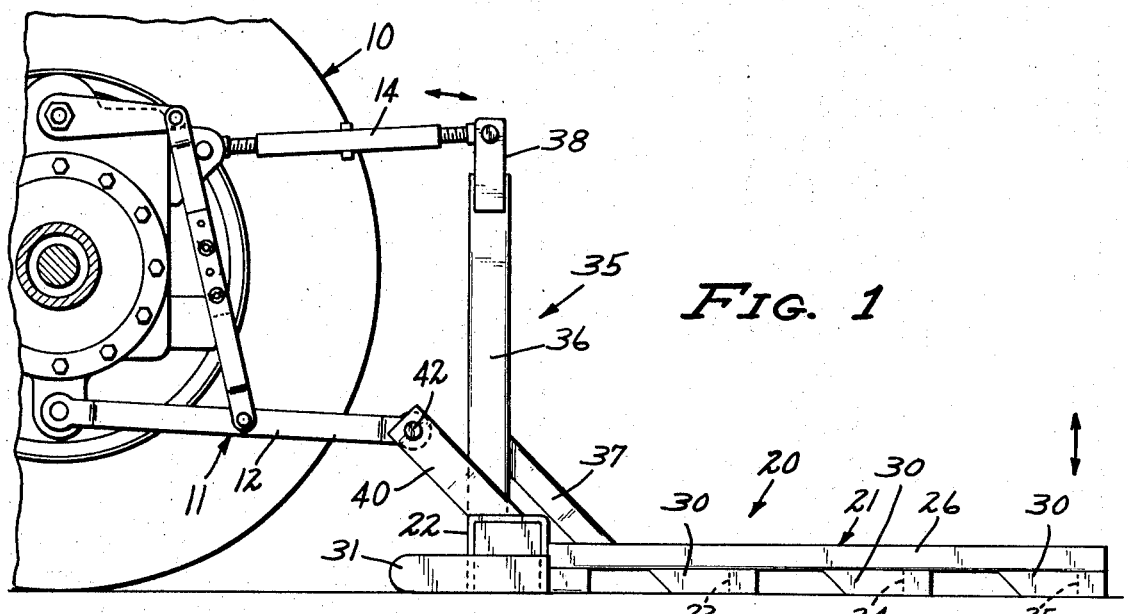
FIG. 1 is a view in side elevation of the present apparatus illustrating a tractor attached thereto with parts thereof removed to illustrate the attachment.
Figure 2:
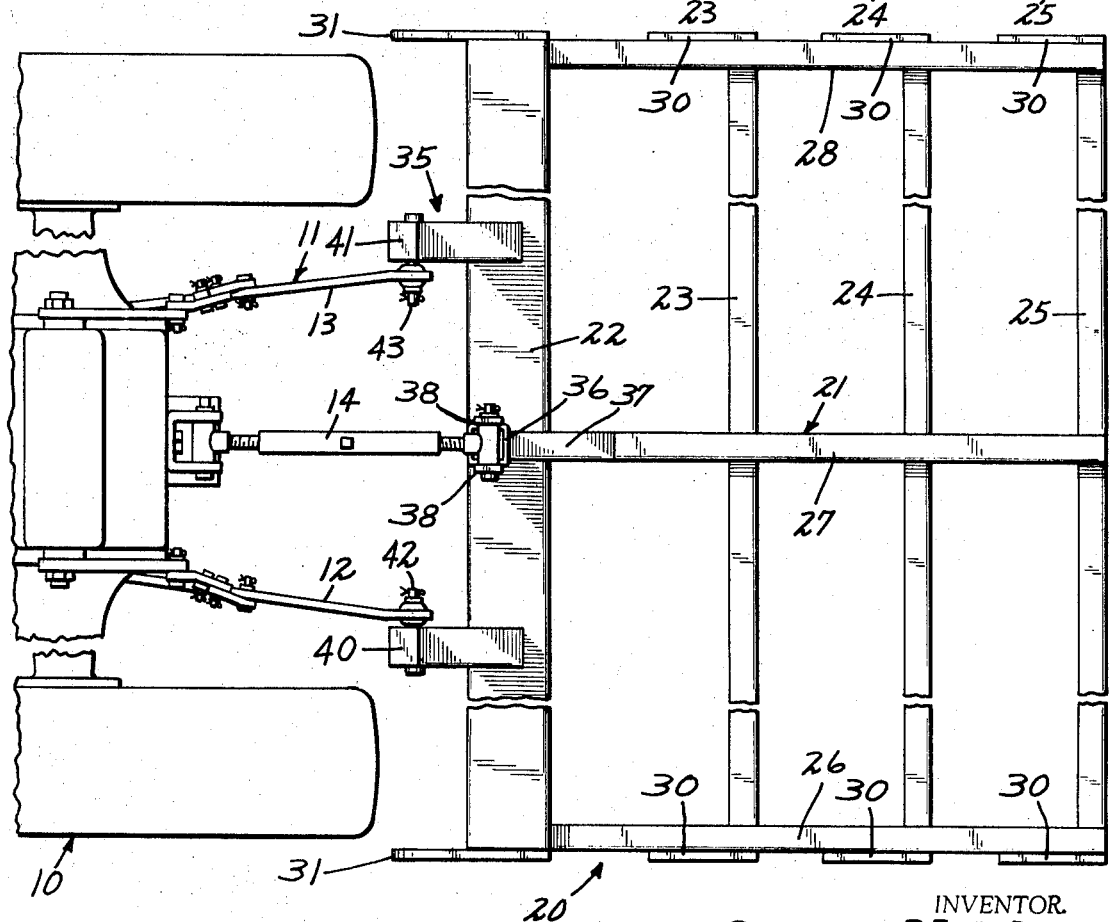
FIG. 2 is a view in top plane of the apparatus illustrated in FIG. 1, parts thereof removed.

In the FIGS. the numeral 10 designates a tractor having a three-point hitch generally designated 11 attached to the rear thereof in the usual manner. The three-point hitch 11 includes two adjustable lift arms 12 and 13 and a central connecting link 14, which connecting link may be an adjustable hydraulic cylinder, a turnbuckle, or the like, that is adjustable in length. In the present embodiment the lift arms 12 and 13 are separately movable for purposes which will become apparent presently. It should be noted that the three-point hitch 11 illustrated in the present embodiment is for exemplary purposes only and although the three-point hitch shown is a category one hitch it should further be understood that any category or type of three-point hitch might be utilized depending upon the particular use to which the apparatus is being placed.

Leveling apparatus generally designated 20 includes a frame 21 having a large transverse beam 22 at the front edge thereof with three smaller beams 23, 24 and 25 extending parallel thereto and approximately equally spaced rearwardly therefrom and three longitudinally extending braces 26, 27 and 28. The beam 22 has an inverted generally U-shaped cross section and the area of the cross section is substantially larger than the area of quantities cross section of either of the beams 23, 24 or 25. The lower edges of the beam 22 and the lower surfaces of the beams 23, attached to and 25 are all approximately parallel and lie approximately in a plane. The braces 26 and 28 are affixed to opposite ends of the beams 23, 24 and 25 and the forwardmost ends thereof are affixed to the rear surface of the beam 22 adjacent the ends thereof. The brace 27 is spaced approximately midway between the braces 26 and 28 and affixed in a similar fashion.

A flat plate or retaining shoe 30 is affixed to each outer end of each of the beams 23, 24 and 25 so as to extend forwardly therefrom toward the next adjacent beam a substantial portion of the distance therebetween. The forward edge of each of the retaining shoes 30 is formed so as to angle generally forwardly and upwardly from the ground level so as to allow small quantities of soil to escape therearound when the leveling apparatus 20 is operating too deep in relatively loose soil. A flat plate or retaining shoe 31 is attached to either end of the forward most beam 22 so as to extend forwardly therefrom and the front edge thereof is arcuate shaped to allow small quantities of soil to escape therearound with a minimum possiblity of forming a ridge. Each of the retaining shoes 30 and 31 is designed to substantially prevent soil from escaping therearound when the leveling apparatus 20 is operating at the correct position relative to the surface of the soil being worked.

Upstanding connecting means generally designated 35 includes a generally vertically positioned central beam 36 having its lower end affixed to the large transverse beam 22 by welding or the like. A strut 37 is affixed between the central beam 36 and the brace 27 to add additional support thereto. Two flat plates affixed to the upper end of the central beam 36 form a clevis 38 in which the rear end of the connecting link 14 is pivotally engaged. The connecting means 35 further includes two connecting beams 40 and 41 fixedly attached at their lower ends to the upper surface of the large transverse beam 22 and spaced approximately equally on either side of the central beam 36. Both of the connecting beams 40 and 41 are affixed so that they extend generally forwardly and upwardly at an angle of approximately 45° with the plane through the lower surfaces of the beams 22 through 25. The connecting beams 40 and 41 each have a pin 42 and 43, respectively, extending transversely therethrough and pivotally connected to the rearmost end of the lift arms 12 and 13, respectively.

The central beam 36 and the connecting beams 40 and 41 are fixedly attached to the frame 21 and the connecting link 14 and the lift arms 12 and 13 are pivotally attached at either end so that actuation of both of the lift arms 12 and 13 simultaneously causes the frame 21 to move vertically. Increasing or decreasing the length of the connecting link 14 produces movement of the upper end of the central beam 36, while the lower end remains substantially stationary, so that the rear portion of the frame 21 moves vertically to position the plane through the lower surfaces of the beams 22 through 25 at an angle to the surface of the ground. Movement of one of the lift arms 12 or 13 without movement of the other, or movement of the lift arms 12 or 13 in opposite directions, will cant the plane through the lower surfaces of the beams 22 through 25 at an angle to the surface of the ground about a longitudinal axis extending in the direction of movement. Further, combinations of the aforedescribed operations will move the frame 21 so that the plane through the lower surfaces of beams 22 through 25 is positioned at substantially any desired orientation relative to the surface of the ground. Thus, the surface of the ground can be smoothed or leveled at substantially any desired angle and even relatively deep loose soil can be worked by raising the rear end of the frame 21 a distance sufficient to prevent the dirt from escaping around the edges or over the top.

While I have shown and described a specific embodiment of this invention, further modifications and improvements will occur to those skilled in the art all of which are intended to come within the spirit and scope of this invention if they perform the functions thereof.

I claim:

1. Apparatus for leveling soil and the like comprising:
   a. a frame including a plurality of elongated ground-engaging members each having a generally rectangular cross section fixedly attached together in parallel spaced-apart relationship with the longitudinal axes of said members extending generally transverse to the direction of motion, each of said members having their respective lower surfaces positioned parallel and in a plane with similar surfaces on the remaining members;
   b. a forwardmost scraper member encompassing a substantially larger cross-sectional area than said ground engaging members attached to the forwardmost point of said frame in general parallel spaced-apart relationship with said ground engaging members and having an inverted U-shaped cross section for providing some scraping action, the lower edges of said scraper member lying generally in the plane of said lower surfaces of said ground engaging members;
   c. upstanding connecting means rigidly attached to said frame for attaching said frame to a three-point hitch connected to draft means so that the position of said frame can be changed to place the plane of said lower edges in any desired orientation relative to the ground;
   d. a retaining shoe attached to each end of each ground-engaging member and said scraper member to prevent soil from escaping around either end thereof.

2. Apparatus for leveling soil as set forth in claim 1 wherein the upstanding connecting means includes a generally vertical central beam fixed adjacent the lower end to the frame and constructed for attachment to the central link of a three-point hitch and further includes a beam on each side of said central beam affixed adjacent the lower ends to the frame and angling generally upwardly and forwardly of said apparatus for attachment to the vertically adjustable lift arms of the three-point hitch.

3. Apparatus for leveling soil as set forth in claim 1 wherein the upstanding connecting means is constructed for attachment to a three-point hitch of the first category.